(12) United States Patent
Borgogno et al.

(10) Patent No.: US 6,353,291 B1
(45) Date of Patent: Mar. 5, 2002

(54) ELECTROLUMINESCENT LAMP CONTROLLER

(75) Inventors: Victor Borgogno; Brad Borgogno, both of Nevada City; Mark Bevington, Grass Valley, all of CA (US)

(73) Assignee: IllumaGraphics, LLC, Sparta, MI (US)

( * ) Notice: Subject to any disclaimer, the term of this patent is extended or adjusted under 35 U.S.C. 154(b) by 0 days.

(21) Appl. No.: 09/497,607

(22) Filed: Feb. 3, 2000

Related U.S. Application Data

(60) Provisional application No. 60/123,742, filed on Mar. 10, 1999, and provisional application No. 60/134,168, filed on May 13, 1999.

(51) Int. Cl.[7] .............................................. H05B 37/02
(52) U.S. Cl. .................... 315/169.3; 315/156; 315/158; 315/308
(58) Field of Search .......................... 315/169.3, 209 R, 315/224, 149, 156, 158, 308

(56) References Cited

U.S. PATENT DOCUMENTS 5,493,183 A * 2/1996 Kimball ...................... 315/308
6,043,609 A * 3/2000 George et al. ............ 315/169.3

* cited by examiner

Primary Examiner—David Vu
(74) Attorney, Agent, or Firm—Warner Norcross & Judd

(57) ABSTRACT

Electronic sensing circuits monitor multiple sized EL cells, referred to as a lamp, and compensate for variations in contrast between cells, while maintaining a fixed contrast between the luminance of the cells and the ambient lighting. In one embodiment, three separate feedback loops monitor the ambient lighting, cell-luminance, and frequency of the excitation voltage and make appropriate adjustments to an adjustable luminance reference. In another embodiment the circuit which drives the EL cells includes a timer and a microprocessor. The timer measures the elapsed time during which the EL display has been operating. The microprocessor adjusts the drive signal to the EL display to correct for aging, based on the elapsed time measured by the timer and an empirically-determined aging parameter. All these adjustments are accomplished while a microprocessor sequences through a large assortment of electroluminescent cells of various sizes.

27 Claims, 6 Drawing Sheets

ELECTROLUMINESCENT LAMP CONTROLLER

This application claims benefit of 60/123,742, filed Mar. 10, 1999, which also claims benefit of 60/134,168, filed May 13, 1999.

BACKGROUND

1. Field of Invention

The present invention is directed to controllers for electroluminescent lamps. More specifically, the invention involves electronic control circuits that sense and enhance the viewing contrast of various sized cells within electroluminescent (EL) lamps while these cells are dynamically switched.

2. Discussion of Related Art

EL lamps provide solutions to many lighting problems that require very thin yet rugged structures, which are light and flexible and have an infinite number of sizes and shapes. EL lamps are also fairly inexpensive and simple to construct. The controllers required for EL lamps must obtain a lamp brightness that allows a viewer the ability to distinguish the shapes and information presented by the lamp's design. The maintenance and control of this brightness becomes more complicated when considering the large voltages involved and variables such as changing ambient lighting, switching between cells of different sizes, extending the limited lifetimes of EL lamps, and operating within the limitations imposed by the lamp construction.

EL lamps are also subject to aging effects that vary the brightness of the lamps' output even when driven with a constant amplitude and frequency drive signal. EL lamps are capacitive in nature, and the capacitance of the EL lamp varies with the operating age of the EL lamp (i.e., the time during which the EL lamp has been operated). In addition, the surface area of the EL lamp is a determinant of the amount of capacitance. Construction techniques of various manufacturers are a further determinant of the initial amount of capacitance exhibited by an EL lamp.

Inventors have created controllers that supply the large voltages necessary to drive EL lamps and some have added compensation techniques that improve visibility. However, U.S. Pat. Nos. 5,519,288 and 5,517,089 sense only the output voltage to the EL lamp, which does not provide proper compensation concerning the issues of changing ambient light and switched-multiple-sized cells, nor does it adequately correct for aging. U.S. Pat. No. 5,440,208 senses only the current flowing through the EL lamp, which does not provide proper compensation concerning the issues of changing ambient light and switched-multiple-sized cells, nor does it adequately correct for aging. U.S. Pat. No. 5,336,978 senses the light output of a single cell, which does not provide proper compensation concerning the issues of changing ambient light nor switched-multiple-sized cells. U.S. Pat. No. 5,293,098 does not sense any of the output conditions of the lamp, thus changing ambient light, switched-multiple-sized cells and aging are not properly compensated. U.S. Pat. No. 5,144,203 delivers only constant power to EL lamp which does not provide proper compensation concerning the issues of changing ambient light and switched-multiple-sized cells, nor does it adequately correct for aging. U.S. Pat. No. 5,089,748 senses the light output of a single lamp which does not provide proper compensation concerning the issues of changing ambient light and switched-multiple-sized cells. U.S. Pat. No. 4,443,741 senses the current of a single lamp, which does not provide proper compensation for the issues of changing ambient light and switched-multiple-sized cells. U.S. Pat. No. 4,319,165 adjusts the power factor of a single lamp, which does not provide proper compensation concerning the issues of changing ambient light and switched-multiple-sized cells, nor does it adequately correct for aging.

All controllers known heretofore suffer from a number of disadvantages. Firstly, changing ambient light dramatically decreases the viewer's ability to distinguish information being presented by the lamp. Unfortunately manual adjustments of luminance to compensate for changing ambient light conditions require constant intervention. In addition, high luminance settings can significantly reduce the lifetime of the battery in battery operated EL lamps, while low settings make the lamps ineffective. High luminance settings can also reduce the lifetime of lamps. Presently known controllers cannot adjust luminance when switching between cells of different sizes meaning that large luminance variations and transients result when dynamically switching EL cells within lamps. Proper compensation for EL lamp aging for various sized cells being sequenced within an EL lamp does not exist in the prior art. Further, presently known lamp controllers cannot vary or set the nominal luminance. Finally, presently known lamp controllers can not shut down inverters when lamps are disconnected, resulting in large AC voltages appearing at the controller outputs.

In view of the above disadvantages of the prior art, it is an object of the present invention to provide an ambient sensor that automatically corrects for environmental changes in light directed onto the lamp, making lamp information readable, allowing lamps to age more slowly, and allowing battery operated systems to last longer. It is also an object of the present invention to provide an EL lamp system which operates independently of the aging effects of its EL elements. It is another object of the present invention to provide an EL lamp system which compensates for the age of its EL elements. It is a further object of the present invention to provide adjustable gains in the ambient feedback loop so that a controlled maximum increase in lamp luminance can be selected. It is another object of the present invention to provide appropriate feedback time constants that allow response time of the corrections to track desired changes. It is a still further object of the present invention to provide an automatic ambient control that integrates with selectable settings for lamp luminance, aging in the lamps, and dynamic switching of various sized cells within the lamp. It is yet another object of the present invention to provide frequency and voltage compensation that automatically adjusts the luminance quickly for applications requiring sequencing cells of different sizes. It is still another object of the present invention to provide constant cell-to-cell and long-term luminance to extend lamp lifetime while a lamp is being sequenced through cells of various sizes. It is a further object of the present invention to provide manual luminance control that is independent of AC line input variations and allow for accurate and repeatable levels of luminance for lamps of various constructions.

Further objects and advantages include providing a controller which removes many constraints on lamp designs. This approach can also eliminate many quality control problems with lamp construction. The controller can shut down the inverter whenever the lamp is disconnected, and can shut down the inverter when excessive loads or overheating occur. This approach widens the operational range for lamps and cell sizes. Still further objects and advantages will become evident with the following descriptions and drawings.

SUMMARY OF THE INVENTION

The above objects are each achieved according to an aspect of the present invention by providing electronic sensing circuits which monitor the multiple-sized electroluminescent cells of the lamp and make adjustments to compensate for variations in the contrast between the cells, while maintaining a fixed contrast between the lamp luminance and the ambient lighting. Separate feedback loops monitor the ambient lighting, the cell luminance and the frequency of the excitation voltage and make appropriate adjustments to an adjustable luminance reference. The adjustments occur while a microprocessor sequences through an assortment of electroluminescent cells of various sizes. In another embodiment, instead of having a feedback loop to monitor the lamp luminance as it decreases due to aging, the circuit which drives the EL lamp includes a timer and a microprocessor. The timer measures the elapsed time during which the EL display has been operating. The microprocessor adjusts the drive signal to the EL display to compensate its brightness to be independent of its age, based on the elapsed time measured by the timer and an empirically-determined aging parameter.

BRIEF DESCRIPTION OF THE DRAWINGS

The invention will be better understood by reference to the appended figures, in which.

DETAILED DESCRIPTION OF THE INVENTION

Figure 1:
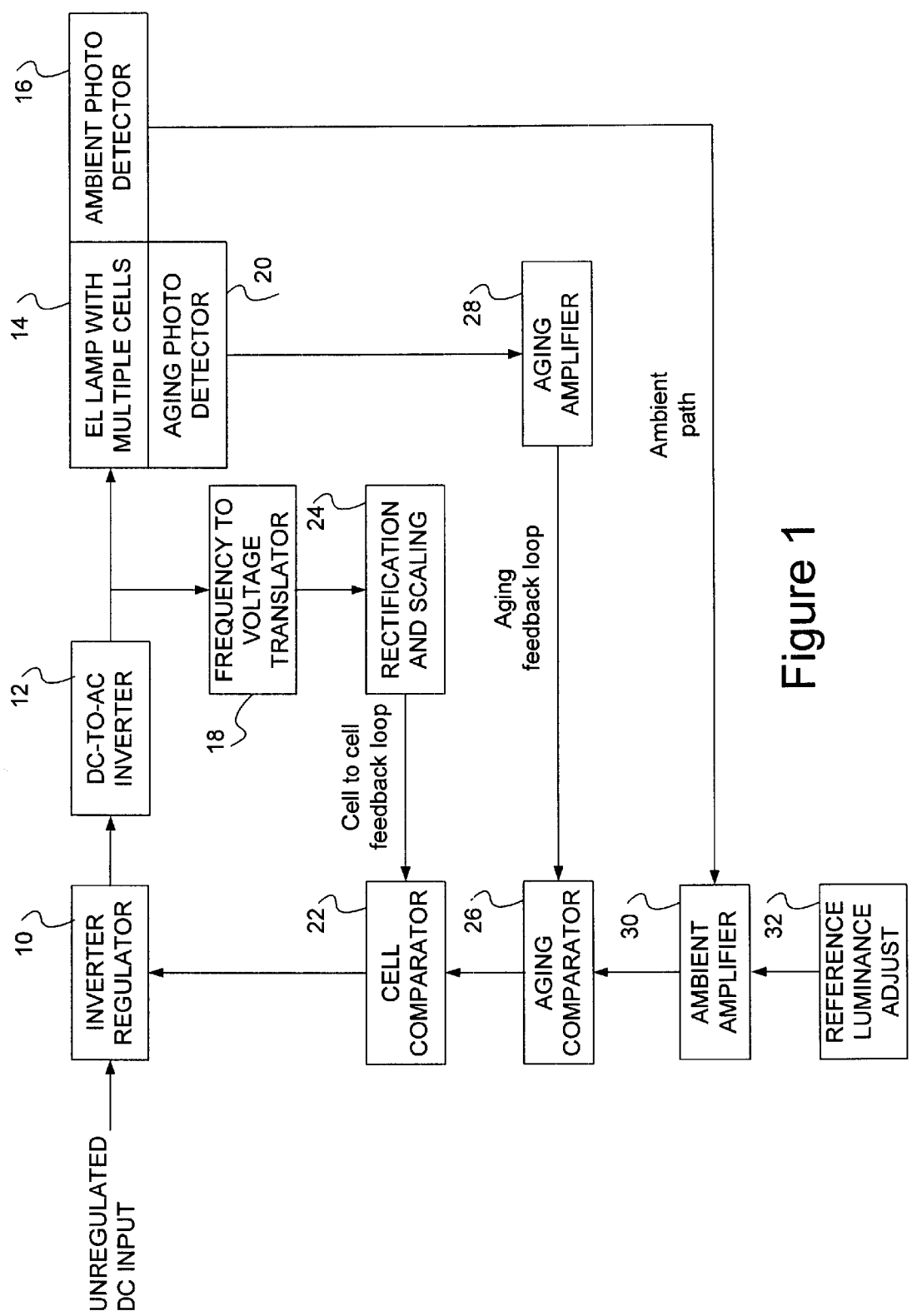
FIG. 1 is a block diagram showing the two-feedback control loops and two additional control paths according to a preferred embodiment of the invention.
Figure 2A:
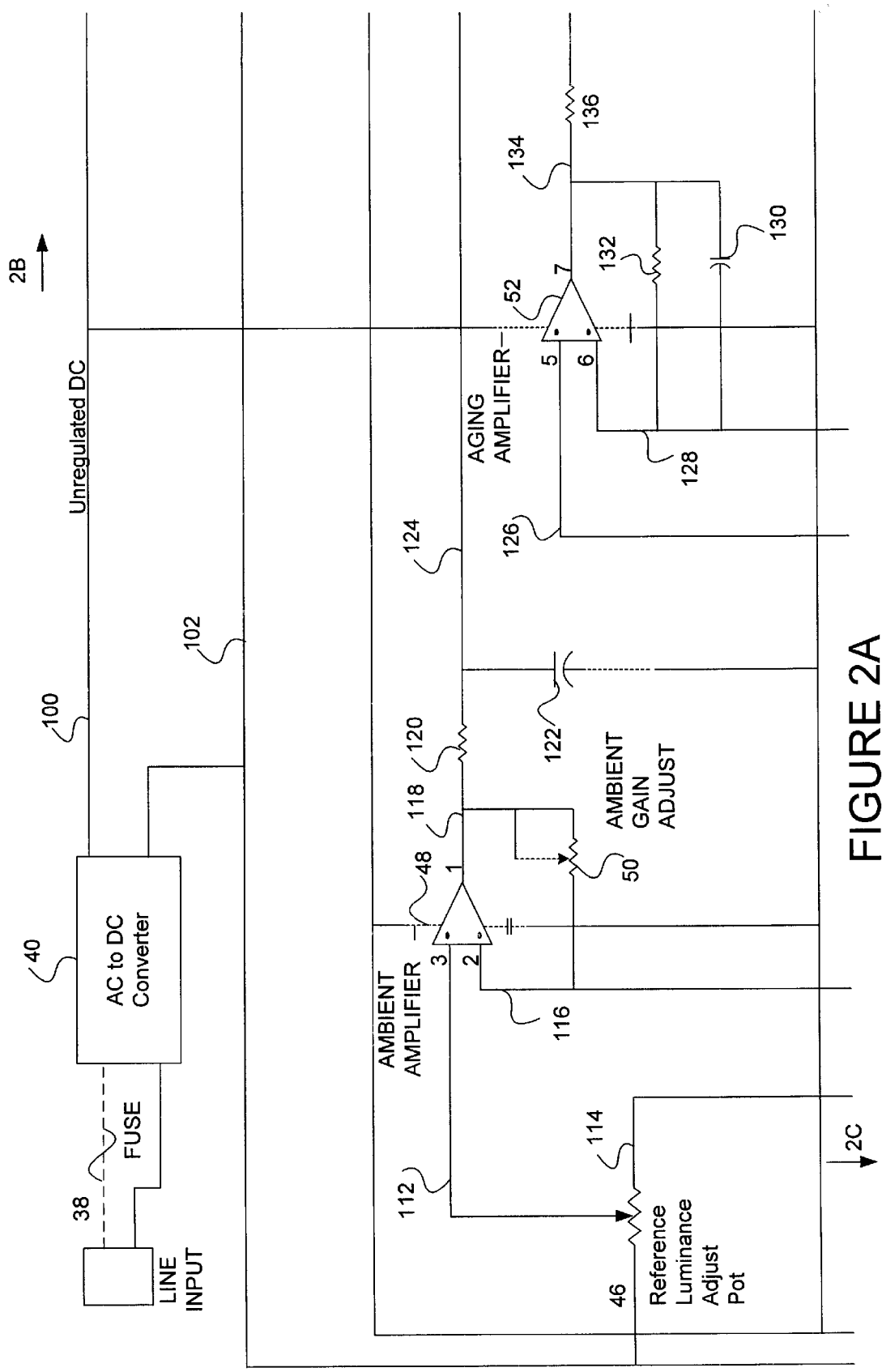
FIG. 2 is a schematic diagram showing the connection with a controller.
Figure 2B:
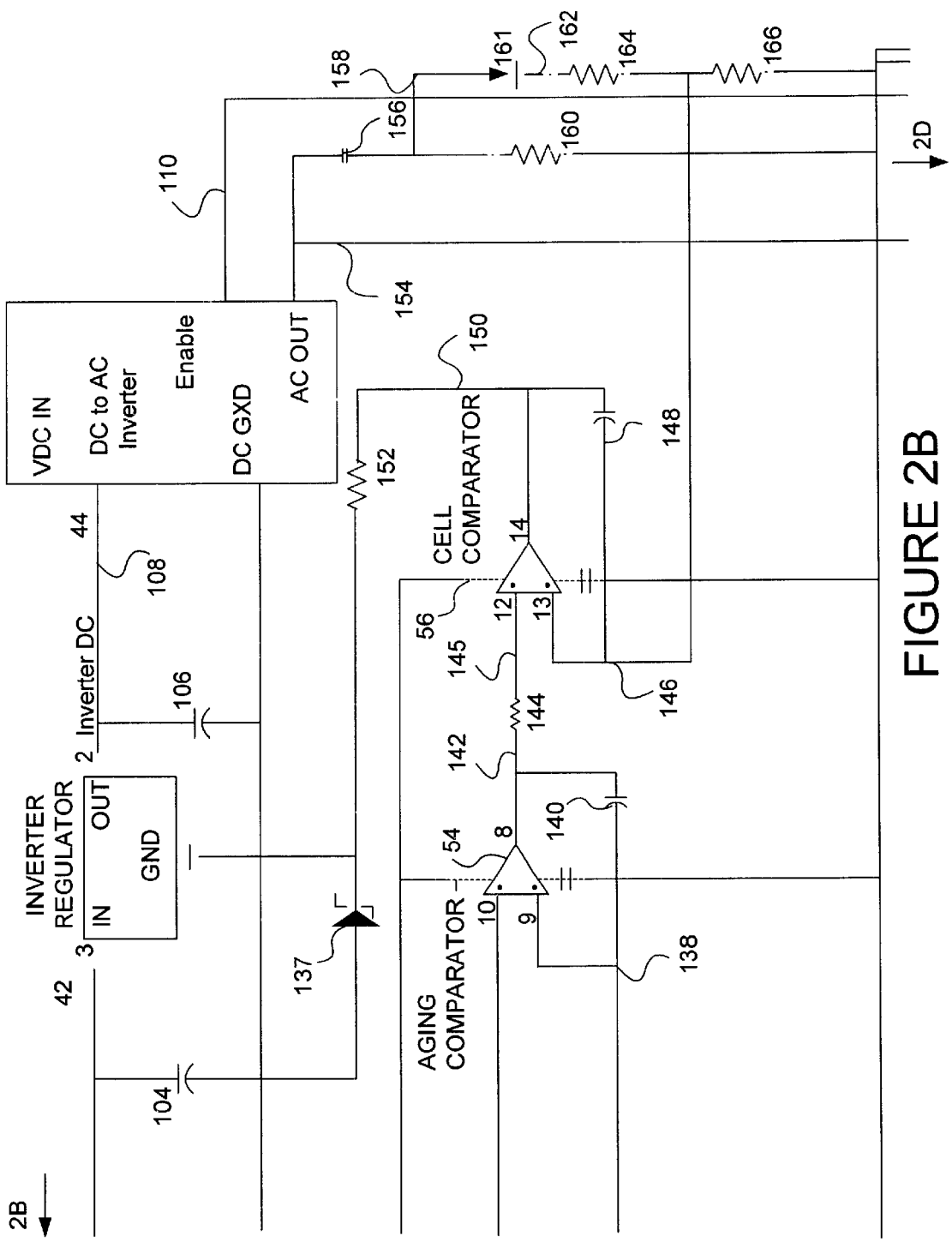
Figure 2C:
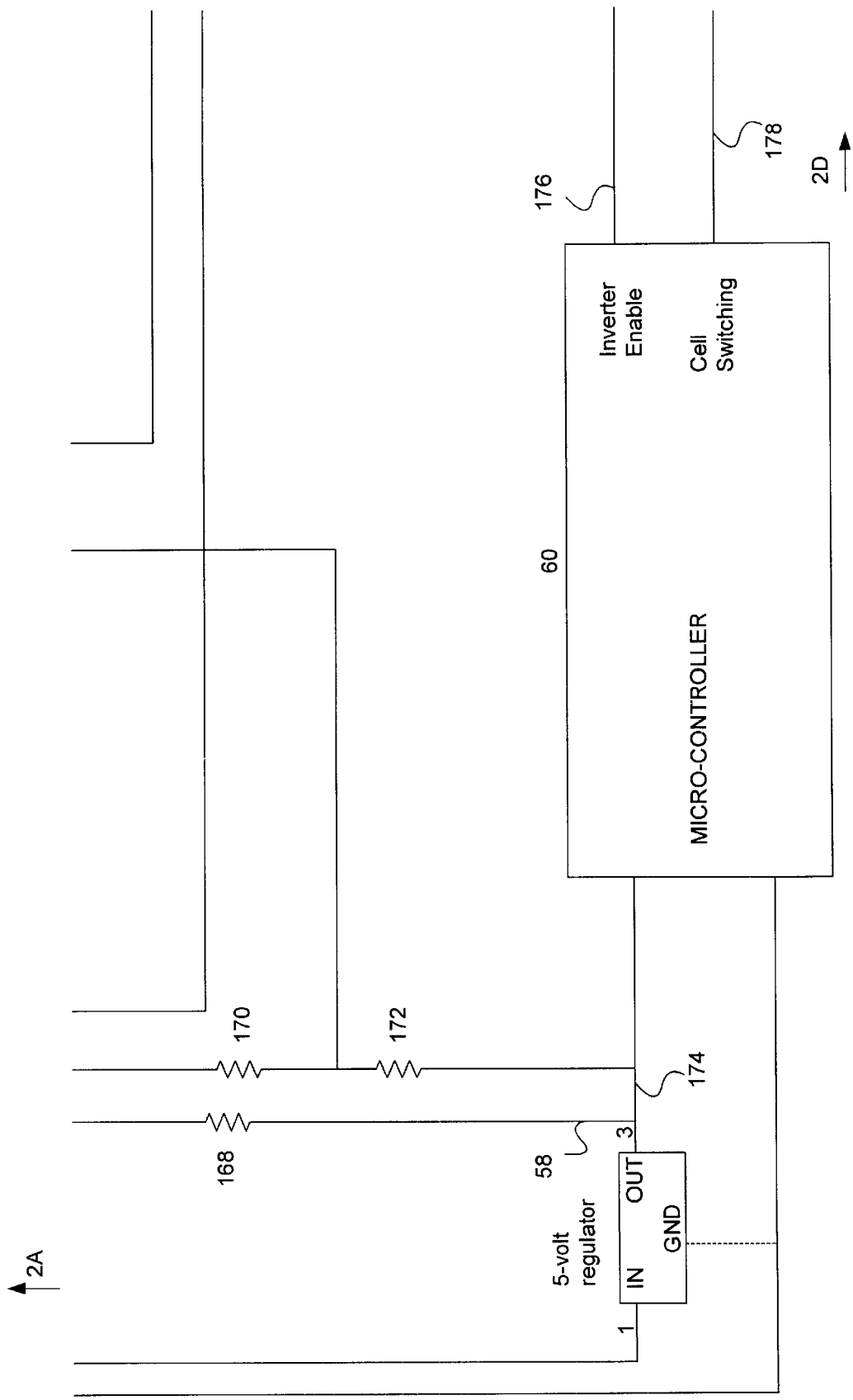
Figure 2D:
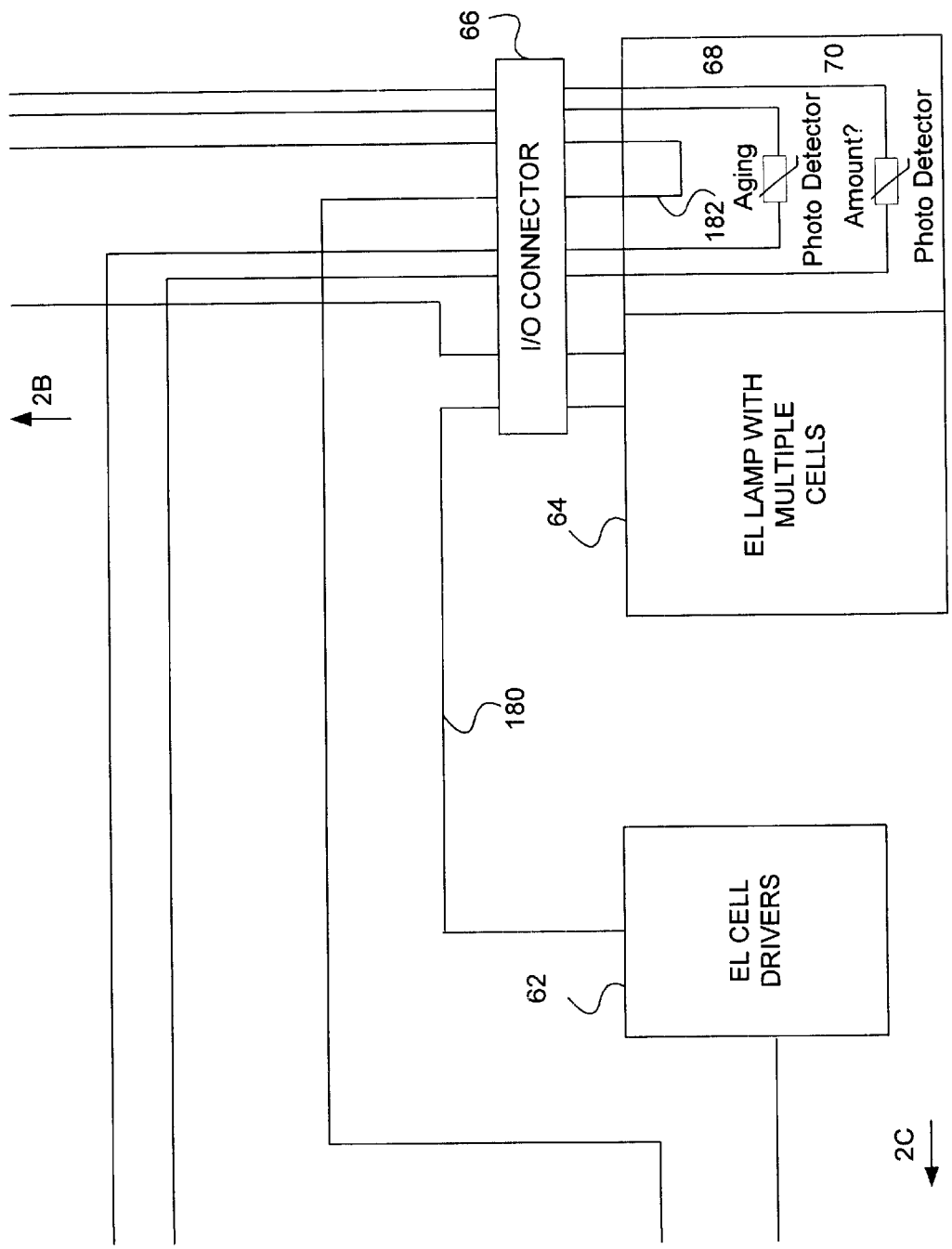

The invention will now be described with reference to preferred embodiments. One typical embodiment of the invention is shown in FIG. 1 where blocks show four separate and distinct paths by which the luminance of the lamp is controlled. These paths are as follows: (1) "Reference luminance path" where a user will adjust the desired luminance of the lamp; (2) "Ambient path" where environmental lighting incident on the lamp will control the luminance of the lamp; (3) "Aging feedback loop" where aging, lamp construction, and efficiency of the lamp are eliminated and do not affect the luminance of the lamp; and (4) "Cell-to-cell feedback loop" where cell-size or combinations of cells do not affect the luminance of the cell or cells being illuminated.

All four paths operate in harmony with one another and allow a reference luminance adjust 32 to set a nominal lamp luminance through ambient amplifier 30, aging comparator 26, cell comparator 22, inverter regulator 10, DC-to-AC inverter 12, and EL lamp with multiple cells 14 around which each of the other three paths will operate. An "ambient path" is composed of ambient photo detector 16, ambient amplifier 30, aging comparator 26, cell comparator 22, inverter regulator 10, DC-to-AC inverter 12, EL lamp with multiple cells 14, where an "aging feedback loop" is composed of aging photo detector 20, aging amplifier 28, aging comparator 26, cell comparator 22, inverter regulator 10, DC-to-AC inverter 12, EL lamp with multiple cells 14, and where a "cell-to-cell feedback loop" is composed of frequency to voltage translator 18, rectification & scaling 24 and cell comparator 22, inverter regulator 10, DC-to-AC inverter 12, EL lamp with multiple cells 14. It will be seen that each of these loops makes use of the section composed of inverter regulator 10 and DC-to-AC inverter 12. For ease of reference, this group of components will be referred to herein as the "EL drive section".

The "reference luminance path" uses the reference luminance adjust 32 to generate a level for the ambient amplifier 30, which is compared with a signal from the "ambient path" to form a signal to the aging comparator 26, which is compared to a signal from the "aging feedback loop" to form a signal to the cell comparator 22, which is compared to a signal from the "cell-to-cell feedback loop" to form a signal to inverter regulator 10, which varies the DC voltage into the DC-to-AC inverter 12, which in turn sets the luminance of the EL lamp with multiple cells 14.

The "ambient path" uses the ambient photodetector 16 to monitor the incident light on the EL lamp 14 to generate a signal proportional to the incident light, which is compared in the ambient amplifier 30 with the desired level from the reference luminance 32. This signal will be applied to the aging comparator 26 and compared to a signal from the "aging feedback loop" to form a signal to the cell comparator 22. The cell comparator 22 will compare this signal to the signal from the "cell-to-cell feedback loop" to form a signal to the inverter regulator 10, which in turn will change the input signal to the DC-to-AC inverter 12. The DC-to-AC inverter 12 will then change the luminance on the EL lamp with multiple cells 14.

The "aging feedback loop" uses the aging photo detector 20 to monitor the luminance of the lamp 14 and generate a signal proportional to the average lamp luminance; this signal will then be applied to the aging amplifier 28. The output of the aging amplifier 28 will be compared in the aging comparator 26 to a composite signal made up of information from the ambient photodetector 16 and the desired reference luminance 32. Whenever the signal from the aging amplifier 28 is different than the signal from the ambient amplifier 30 the output of the aging comparator 26 will change the magnitude of the signal into the cell comparator 22. This in turn will activate the inverter regulator 10 to supply a DC output signal to the DC-to-AC inverter 12, which increases or decreases the luminance to the EL lamp with multiple cells 14. The feedback control loop is satisfied when the aging comparator 26 inputs are equal.

The "cell-to-cell feedback loop" uses the frequency-to-voltage converter 18 to generate a signal proportional to frequency and voltage so that the rectification and scaling 24 can generate a signal. The cell comparator 22 compares this rectified and scaled signal to a composite signal made up of information from the aging comparator 26. Whenever the rectified and scaled signal from 24 is different than the signal from the aging comparator 26 the output of the cell comparator 22 will activate the inverter regulator 10. The inverter regulator 10 then supplies a DC output signal to the DC-to-AC inverter 12, which increases or decreases the luminance to the EL lamp with the multiple cells 14. The feedback control loop is satisfied when the cell comparator 22 inputs are equal.

From the description above, a number of advantages of the present invention become evident. Firstly, ambient sensing acts as an automatic reference level adjustment which eliminates user adjustments and allows for optimum performance. Secondly, the inverter regulator provides a stable and constant voltage to the DC-to-AC inverter 12 that is a function of four different signals. Further, with the "cell-to-cell feedback loop" as the inner loop, cell switching can occur at high speeds. Another advantage is that the "ambient path" can have a selectable response time so that changes due to moving shadows or unwanted changes in environmental lighting can be eliminated. Further, aging and ambient photo detectors 16 and 20 can be physically located on the EL lamp with multiple cells 14.

The operation of the preferred embodiment can best be understood by referring to FIG. 2, which shows how the preferred embodiment integrates into a controller. FIG. 2 consists of several detailed groups of components. The power source consists of line input and fuse 38 along with the AC to DC converter 40 out of which an unregulated DC voltage is available. The control elements include inverter regulator 42; reference luminance adjust pot 46; ambient amplifier 48; ambient gain adjust 50; aging amplifier 52; aging comparator 54; and cell comparator 56. A further component is the DC-to-AC Inverter 44. Lamp switching elements and I/O connector consist of the regulator 58, micro-controller 60, EL cell drivers 62 and I/O connector 66. Lamp elements consist of EL lamp with multiple cells 64, aging photo detector 68 and ambient photo detector 70.

AC power to operate the preferred embodiment and the associated groups or elements in a controller is input through the line input and fuse 38, and then into the AC to DC converter 40 out of which an unregulated DC voltage is generated on line 100 relative to the converters return path 102. This unregulated DC voltage is distributed and used to operate the inverter regulator 42, regulator 58, ambient amplifier 48, aging amplifier 52, aging comparator 54, and cell comparator 56. To simplify and reduce the cost of the system, the operational amplifiers are being operated from a single voltage power supply, but could just as easily be operated from a bipolar power source.

The unregulated DC line 100 provides the regulator 58 with power to generate the direct current for the micro-controller and the resistor divider. The resistor divider is made up of resistor 168 and the reference luminance adjust potentiometer 46. The resistor 168 limits the maximum voltage at line 114 and thus limits the maximum voltage available for the reference luminance adjust potentiometer 46.

When a user adjusts the reference luminance adjust potentiometer 46 the voltage level at line 112 changes and sets the operating point for the non-inverting input of the ambient amplifier 48.

The voltage at the inverting input of the ambient amplifier 48 is determined by the ambient gain adjust 50 and the ambient photo detector 70. If the ambient light increases, the photo detector 70 would decrease resistance and force the output of the ambient amplifier 48 to increase The output voltage $V_{118}$ at line 118 of the ambient amplifier is equal to:

$$V_{118} \approx V_{ref}(1+R_{50}/R_{apd})$$

where $V_{ref}$ is the voltage from the reference luminance adjust pot 46, $R_{50}$ is the resistance of the ambient gain adjust pot 50 in the feedback path of the ambient amplifier 48, and $R_{apd}$ is the resistance of the ambient photo detector 70. The resistance $R_{apd}$ is inversely proportional to the ambient light falling on its surface:

$$R_{apd} \approx 1/L_{amb}$$

Where $L_{amb}$ is the ambient light falling onto the surface of the photo detector. When $R_{apd}$ is substituted into the equation for the line 118 voltage $V_{118}$, the following relationship is valid:

$$V_{118} \approx V_{ref}(1+R_{50}L_{amb})$$

The ambient gain adjust pot 50 allows for various gains and operational ranges, but allows the desired relationship of voltage at line 118 to be proportional to the ambient luminance.

Line 118 attaches to the Butterworth filter made up of the resistor 120 and the capacitor 122. This filter provides a slow response to ambient lighting that changes quickly, such as when there are shadows from passing objects. Line 124 attaches to the non-inverting input of the aging comparator 54. Note that the non-inverting input does not load down the filter, and so the voltage at line 124 has the same DC level as the voltage at line 118.

The resistor divider made up of resistors 172 and 170, provides a voltage on line 126 to the non-inverting input of the aging amplifier 52; the physical properties of the EL lamp with multiple cells 64 determine these resistors and fix the operating point.

The fixed resistor 132 and the aging photodetector 68 determine the line 128 voltage of the inverting input on the aging amplifier 52. If the light from the EL lamp with multiple cells 64 increases, the photo detector 68 would decrease in resistance and force the output of the aging amplifier 52 to increase. The output voltage $V_{134}$ at line 134 of the aging amplifier is equal to:

$$V_{134} \approx V_{126}(1+R_{132}/R_{age})$$

Where $V_{126}$ is the voltage at line 126. $R_{132}$ is the resistance of the resistor 132 in the feedback path of the aging amplifier 52; Rage is the resistance of the aging photo detector 68. The resistance $R_{age}$ is inversely proportional to the light coming from EL lamp with multiple cells 64.

$$R_{age} \approx 1/L_{age}$$

Where $L_{age}$ is the light from the EL lamp with multiple cells 64 hitting the surface of the aging photo detector 68. When $R_{age}$ is substituted into the equation for the line 134 voltage $V_{134}$, the following relationship is valid:

$$V_{134} \approx V_{126}(1+R_{132}L_{age})$$

When the aging photodetector is monitoring only one of the cells on the EL lamp with multiple cells 64 the capacitor 130 averages the pulses of light so that the voltage at line 134 is constant over the duration of the sequence time of the lamp 14. The sequence time of the lamp 14 is defined as the time it takes to step through and illuminate all the cells. If multiple cells are monitored or multiple photo detectors are used to monitor the cells, the capacitor 130 can be reduced in size.

The aging comparator 54 has been implemented with capacitor 140 connected between the output and the inverting input, thus forming an integrator. This integrator has a gain that is inversely proportional to the product of resistor 136 and feedback capacitor 140. The voltage at line 142 is dependent on the magnitudes of the voltage on line 124 and line 134 When the voltage on line 124 is larger than the voltage on line 134, the voltage on output line 142 will increase in a positive direction at a rate proportional to the integrator's time constant:

$$\tau_{age} \approx R_{136}C_{140}$$

where $R_{136}$ is the resistance of the resistor 136 and $C_{140}$ is the capacitance of the capacitor 140. The time constant for this loop is very long and must be long enough to average the light pulses from the cells being monitored.

The cell comparator 56 has been implemented with capacitor 148 connected between the output and the inverting input, thus forming an integrator. This integrator has a gain that is inversely proportional to the product of resistor 144 and feedback capacitor 148. The voltage at line 150 is dependent on the magnitudes of the voltages on line 142 and line 146. When the voltage on line 142 is larger than line 146, the output line 150 will increase in a positive direction at a rate proportional to the integrator's time constant:

$$\tau_{cell} \approx R_{144}C_{148}$$

where $R_{144}$ is the resistance of the resistor 144 and $C_{148}$ is the capacitance of the capacitor 148. The time constant for this loop is much smaller than for the aging loop and thus it responds much more quickly to switching between cells of various sizes.

The level of the voltage at line 150 determines the output voltage of the adjustable converter regulator 42. The resistor 152 and zener 137 form a limiter on the voltage that can be applied to the DC-to-AC inverter 44. Capacitor 104 filters the unregulated DC voltage on line 100 and the capacitor 106 filters noise reflected back from the DC-to-AC inverter 44.

When the voltage at line 108 increases, the output line 154 of the DC-to-AC Inverter 44 will increase and cause more light to be emitted from the EL lamp with multiple cells 64. The increase in voltage at line 108 also increases the voltage applied to the frequency-to-voltage converter made up of capacitor 156, resistor 160, diode 161, resistor 164 and resistor 166. The voltage that appears at line 146 is dependent on the frequency and voltage of cell being activated at any given time. Frequency and voltage levels are a function of the characteristics of the lamp being activated.

The micro-controller 60 controls the sequencing, duration and order in which the cells of the lamp are illuminated; it also enables the DC-to-AC inverter 44 via a trace that passes through the I/O connector 66 and loops on the EL lamp with multiple cells 64. The EL cell drivers 62 are activated via a bus of signals 178 and perform the high power switching of the voltages being applied to the cells of the lamp.

Operation of the aging feedback and cell-to-cell feedback loops can be more clearly demonstrated by assuming the system has stabilized at some reference luminance as dictated by the setting on pot 46 and a constant ambient light value. Assume now that the aging photo detector 68, placed onto the EL lamp with multiple cells 64, senses a decrease in light level due to aging of the lamp. This decreased light level causes the resistance of the photodetector 68 to increase, which causes more voltage to appear at line 128. The voltage at line 134 must decrease to bring the voltage level at line 128 back to equal the voltage on line 126. Since the response of the aging amplifier 52 has been heavily filtered, line 134 slowly decreases in voltage. The aging comparator 54 begins to integrate this voltage and line 142 moves in a positive direction. The voltage at line 142 determines the steady state luminance of a particular cell and the cell-to-cell feedback loop will quickly force the voltage at line 146 to equal the new voltage on line 142. This is accomplished by increasing the voltage at line 150 and thus increasing the voltage at the inverter regulator output. The DC-to-AC inverter 44 quickly responds and increases the voltage at the resistor divider formed by resistor 164 and resistor 166. This in turn makes the voltage at the inverting and non-inverting inputs of the cell comparator 56 equal, thus stabilizing the operational amplifier output. The bandwidth of the cell-to-cell feedback loop is much larger than that of the aging feedback loop and as such can acquire or easily follow changes of the voltage at line 142. Once the voltages are equal the output voltage of the DC-to-AC inverter 44 will have increased to a level such that the EL lamp with multiple cells 64 is emitting enough light to return the resistance of the aging photo detector 68 to its original value.

Switching between cells of different sizes can cause large changes in the luminance of the cell being activated unless the frequency and voltage are monitored and used for controlling the voltage applied to the EL lamp with multiple cells 64. This task is handled by the cell comparator loop as discussed in the operation of the aging feedback loop.

Figure 3:
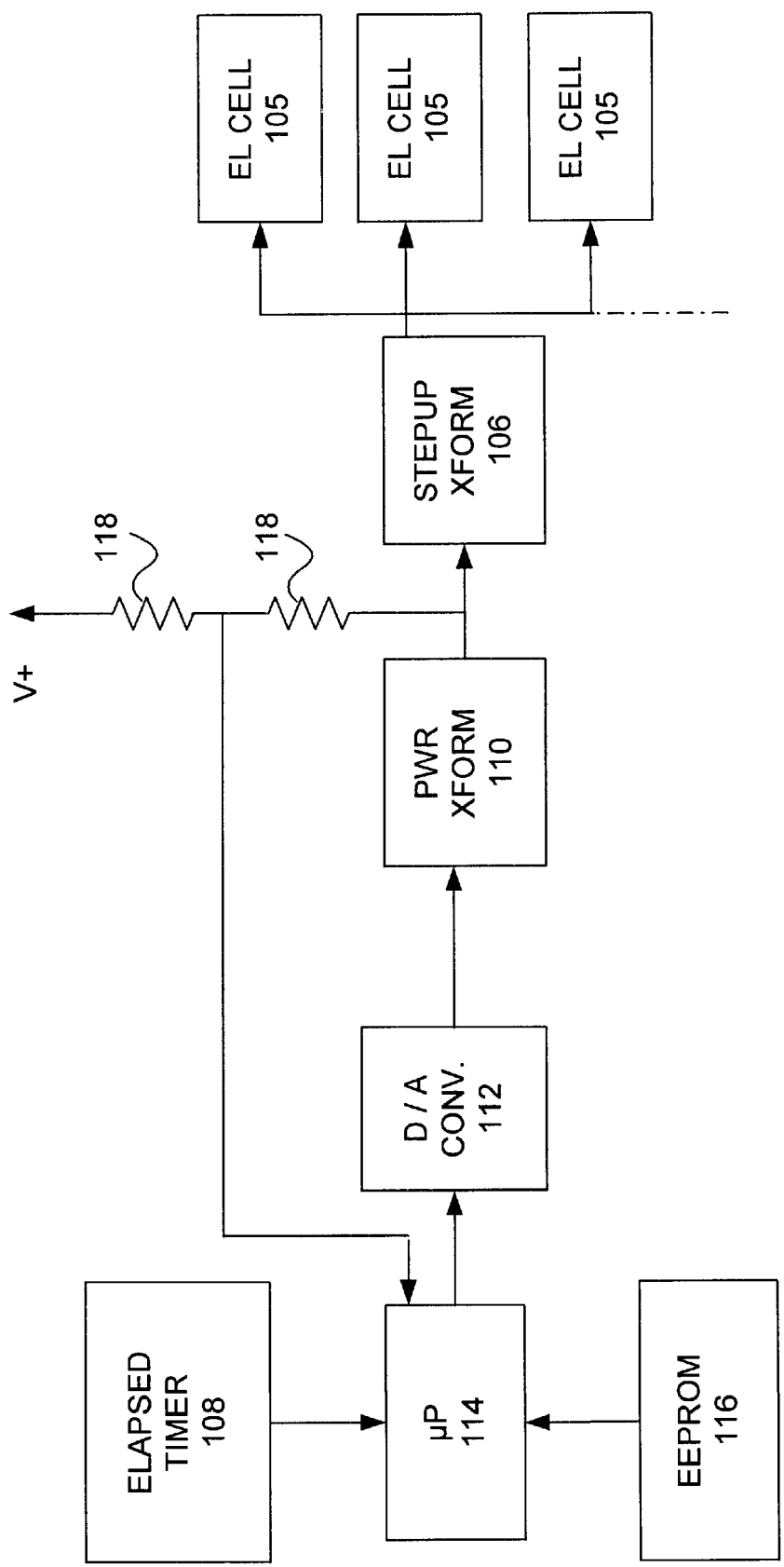
FIG. 3 is a block diagram showing an alternate aging compensation means, including a timer and microprocessor according to a preferred embodiment of the present invention.

In a second embodiment, a timer which is attached to the EL lamp circuitry replaces the aging feedback loop. FIG. 3 schematically illustrates a circuit 100 in accordance with this second preferred embodiment of the present invention. Here, a display of EL lamps 102 includes multiple EL cells 105. A step-up transformer 106 receives a power signal 108 from a power-switching transformer 110. The power-switching transformer 110 provides a stepped-up power signal in the form of power pulses to drive the EL cells 105. The power-switching transformer is driven by an analog signal provided from a digital-to-analog (D/A) converter 112. The analog signal provided from the D/A converter 112 corresponds to a digital word provided from a microprocessor 114.

The brightness of the light output from an individual one of the EL cells 105 is dependent upon the amplitude and frequency of a sinusoidal voltage signal provided to drive the EL cells 105.

No matter what the shape of the periodic voltage waveform employed to drive the EL cells 105, the frequency and amplitude of the voltage signal provided to drive the EL cells 105 is dependent upon the digital signals provided from the microprocessor 114 to the D/A converter 112.

In general, the brightness of the cells 105 can be considered to vary proportionally with the operating age of the EL lamp 102. Furthermore, cells 105 of different manufacturers generally have different light output brightness characteristics.

In accordance with this embodiment, the aging characteristic is determined empirically. For example, if the brightness is considered to vary proportionally with operating age, an EL lamp 102 of a particular manufacturer is operated over time and the light output measured and the proportionality constant determined. For all EL lamps 102 of this manufacturer, the proportionality constant is now "predetermined".

That is, the microprocessor 114 measures the "operating age" of the EL lamp system 102 using an elapsed time clock 108. The microprocessor then corrects for the aging process by varying either the amplitude of the periodic voltage waveform employed to drive the EL cells 105 or by varying the frequency of the periodic voltage waveform employed to drive the EL cells 105. In one embodiment, the microprocessor 114 measures the operating age of the EL cells 105 every hour and adjusts the periodic voltage waveform accordingly. An electrically erasable programmable read-only memory (EEPROM) 116 may be provided into which the elapsed operating time may be recorded and held when the circuit 100 is powered down. The microprocessor 114 also receives an input from sense resistor divider 118 as a representation of the drive voltage.

Accordingly, this invention provides several advantages over conventional approaches to controlling EL lamps:

a. Automatically maintains the contrast between the EL lamp and the ambient lighting;
b. Automatically maintains the luminance as the lamp ages, thus increasing the useful lifetime;
c. Uses the frequency and voltage for maintaining constant luminance of a cell;
d. Eliminates stringent fabrication requirements of EL lamps;
e. Provides for manual luminance settings;
f. Allows one DC-to-AC Inverter to operate with multiple sized cells; and
g. Provides high speed switching between cells of various sizes.

Although the description above contains the details of preferred embodiments, these should not be construed as limiting the scope of the invention, but as merely illustrative of the invention. Indeed, variations of the invention will be readily apparent to those skilled in the art and also fall within the scope of the invention. Thus the appended claims and their legal equivalents should determine the scope of the invention.

What is claimed is:

1. A lamp controller for controlling an EL lamp, the controller comprising:
   an EL drive section;
   reference control means for controlling the EL drive section to cause the EL lamp to have a predetermined brightness;
   ambient light compensation means for detecting an amount of ambient light to the EL lamp and controlling the EL drive section responsive thereto;
   aging compensation means for detecting an age of the EL lamp and controlling the EL drive section responsive thereto; and,
   cell-to-cell compensation means for compensating differences in brightness between elements of the EL lamp.

2. The controller of claim 1, wherein the ambient light compensation means comprises:
   a photodetector for detecting the amount of ambient light to the EL lamp; and
   an amplifier for amplifying a brightness signal based on an output of the photodetector;
   wherein the EL drive section is connected to an output of a comparator to drive the EL lamp responsive thereto.

3. The controller of claim 1, wherein the aging compensation means comprises:
   a photodetector for detecting the amount of light output by the EL lamp;
   an amplifier for calculating an age of the EL lamp based on the photodetector output; and
   a comparator for comparing an output of the amplifier to a brightness signal; wherein the EL drive section is connected to an output of the comparator to drive the EL lamp responsive thereto.

4. The controller of claim 1, wherein parameters of the amplifier are in correspondence with a type of the EL lamp.

5. The controller of claim 1, wherein the cell-to-cell compensation means includes:
   a frequency-to-voltage converter connected to the EL lamp, for generating an output signal having a voltage representative of a frequency of a drive signal applied to the EL lamp;
   means for processing the output signal to generate a scaling signal; and,
   a comparator for comparing an output of an amplifier to a brightness signal;
   wherein the EL drive section is connected to an output of the comparator to drive the EL lamp responsive thereto.

6. The controller of claim 5, wherein the means for processing is rectifying and scaling the output signal.

7. The controller of claim 1, wherein the aging compensation means comprises:
   a timer which is included in a circuit which drives the EL display, wherein the timer measures the elapsed time during which the EL display has been working; and,
   a microprocessor which, based on the elapsed time measured by the timer and an empirically determined aging parameter, corrects for the aging process.

8. The controller of claim 7, wherein the empirically determined aging parameter is determined by operating an EL lamp of a particular manufacturer over a period of time, measuring the light output over time and determining the proportionality constant for an EL lamp of that manufacturer.

9. A lamp controller for controlling an EL lamp, the controller comprising:
   an EL drive section;
   an ambient light feedback loop for controlling the EL drive section based on ambient light to the EL lamp;
   an aging feedback loop for controlling the EL drive section based on the age of the EL lamp; and,
   a cell-to-cell feedback loop for compensating brightness differences between elements in the EL lamp.

10. The controller of claim 9, wherein the ambient light feedback loop comprises:
    a photodetector for detecting the amount of ambient light to the EL lamp; and
    an amplifier for amplifying a brightness signal based on an output of the photodetector;
    wherein the EL drive section is connected to an output of a comparator to drive the EL lamp responsive thereto.

11. The controller of claim 9, wherein the aging feedback loop comprises:
    a photodetector for detecting the amount of light output by the EL lamp;
    an amplifier for calculating an age of the EL lamp based on the photodetector output; and
    a comparator for comparing an output of the amplifier to a brightness signal;
    wherein the EL drive section is connected to an output of the comparator to drive the EL lamp responsive thereto.

12. The controller of claim 11, wherein parameters of the amplifier are in correspondence with a type of the EL lamp.

13. The controller of claim 9, wherein the cell-to-cell feedback loop includes:
    a frequency-to-voltage converter connected to the EL lamp, for generating an output signal having a voltage representative of a frequency of a drive signal applied to the EL lamp;
    means for processing the output signal to generate a scaling signal; and,
    a comparator for comparing an output of an amplifier to a brightness signal;
    wherein the EL drive section is connected to an output of the comparator to drive the EL lamp responsive thereto.

14. The controller of claim 13, wherein the means for processing is rectifying and scaling the output signal.

15. The controller of claim 9, wherein the ambient light feedback loop, the aging feedback loop and the cell-to-cell feedback loop all share a common section.

16. The controller of claim 15, wherein the common section is a drive section for the EL lamp.

17. A lamp controller for controlling an EL lamp, the controller comprising:
- an EL drive section;
- reference control means for controlling the EL drive section to cause the EL lamp to have a predetermined brightness;
- aging compensation means for detecting an age of the EL lamp and controlling the EL drive section responsive thereto; and,
- cell-to-cell compensation means for compensating differences in brightness between elements of the EL lamp.

18. The controller of claim 17, wherein the aging compensation means comprises:
- a photodetector for detecting the amount of light output by the EL lamp;
- an amplifier for calculating an age of the EL lamp based on the photodetector output; and
- a comparator for comparing an output of the amplifier to a brightness signal; wherein the EL drive section is connected to an output of the comparator to drive the EL lamp responsive thereto.

19. The controller of claim 17, wherein the aging compensation means comprises:
- a timer which is included in a circuit which drives the EL display, wherein the timer measures the elapsed time during which the EL display has been working; and,
- a microprocessor which, based on the elapsed time measured by the timer and an empirically determined aging parameter, corrects for the aging process.

20. The controller of claim 17, wherein the cell-to-cell compensation means includes:
- a frequency-to-voltage converter connected to the EL lamp, for generating an output signal having a voltage representative of a frequency of a drive signal applied to the EL lamp;
- means for processing the output signal to generate a scaling signal; and,
- a comparator for comparing an output of an amplifier to a brightness signal;
- wherein the EL drive section is connected to an output of the comparator to drive the EL lamp responsive thereto.

21. A lamp controller for controlling an EL lamp, the controller comprising:
- an EL drive section;
- reference control means for controlling the EL drive section to cause the EL lamp to have a predetermined brightness;
- ambient light compensation means for detecting an amount of ambient light to the EL lamp and controlling the EL drive section responsive thereto; and,
- cell-to-cell compensation means for compensating differences in brightness between elements of the EL lamp.

22. The controller of claim 21, wherein the ambient light compensation means comprises:
- a photodetector for detecting the amount of ambient light to the EL lamp; and
- an amplifier for amplifying a brightness signal based on an output of the photodetector;
- wherein the EL drive section is connected to an output of the comparator to drive the EL lamp responsive thereto.

23. The controller of claim 21, wherein the cell-to-cell compensation means includes:
- a frequency-to-voltage converter connected to the EL lamp, for generating an output signal having a voltage representative of a frequency of a drive signal applied to the EL lamp;
- means for processing the output signal to generate a scaling signal; and,
- a comparator for comparing an output of an amplifier to a brightness signal;
- wherein the EL drive section is connected to an output of the comparator to drive the EL lamp responsive thereto.

24. A lamp controller for controlling an EL lamp, the controller comprising:
- an EL drive section;
- reference control means for controlling the EL drive section to cause the EL lamp to have a predetermined brightness;
- ambient light compensation means for detecting an amount of ambient light to the EL lamp and controlling the EL drive section responsive thereto; and,
- aging compensation means for detecting an age of the EL lamp and controlling the EL drive section responsive thereto.

25. The controller of claim 24, wherein the ambient light compensation means comprises:
- a photodetector for detecting the amount of ambient light to the EL lamp; and
- an amplifier for amplifying a brightness signal based on an output of the photodetector;
- wherein the EL drive section is connected to an output of a comparator to drive the EL lamp responsive thereto.

26. The controller of claim 24, wherein the aging compensation means comprises:
- a photodetector for detecting the amount of light output by the EL lamp;
- an amplifier for calculating an age of the EL lamp based on the photodetector output; and
- a comparator for comparing an output of the amplifier to a brightness signal; wherein the EL drive section is connected to an output of a comparator to drive the EL lamp responsive thereto.

27. The controller of claim 24, wherein the aging compensation means comprises:
- a timer which is included in a circuit which drives the EL display, wherein the timer measures the elapsed time during which the EL display has been working; and,
- a microprocessor which, based on the elapsed time measured by the timer and an empirically determined aging parameter, corrects for the aging process.

* * * * *